Dec. 22, 1931. M. HALLEAD 1,837,817
DAMPING MECHANISM FOR SCALES
Filed July 29, 1929
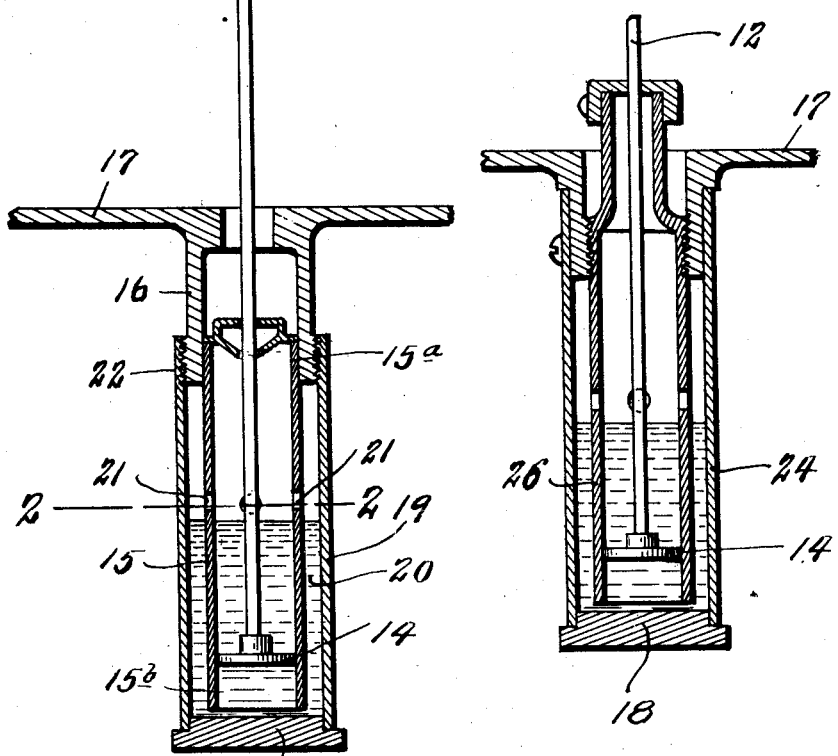
Inventor
Mervil Hallead
By Cornwall Janus
Attys.

Patented Dec. 22, 1931

1,837,817

UNITED STATES PATENT OFFICE

MERVIL HALLEAD, OF COLUMBUS, OHIO, ASSIGNOR TO THE EXACT WEIGHT SCALE COMPANY, OF COLUMBUS, OHIO, A CORPORATION OF OHIO

DAMPING MECHANISM FOR SCALES

Application filed July 29, 1929. Serial No. 381,815.

This invention relates to new and useful improvements in damping mechanism for weighing scales, the primary object of the invention being the provision of a damping mechanism or dashpot which is of simple construction, can be readily adjusted to control the operation thereof, and which can be economically manufactured.

Further objects of the invention are to provide a dashpot consisting of two tubular members of unequal cross sectional areas, the smaller member being arranged within the larger member and spaced therefrom to provide an annular chamber. The smaller or inner member has the lower end open and adapted to cooperate with the corresponding closed end of the longer or outer member. One of said members is adjustable in axial direction to regulate the clearance or communication between the inner and the outer chambers.

Other objects of the invention are to provide an open-ended fixed tubular member in which is operatively mounted a piston actuated by a movable part of a scale and to provide a larger tubular member enclosing said inner member and spaced therefrom to provide an annular chamber, said outer member having a bottom wall which is arranged adjacent to the open lower end of said inner member and is adjustable relatively thereto to regulate the flow of liquid between said chamber.

With these and other objects in view, my invention consists in certain novel features of construction and arrangement of parts, hereinafter more fully described and claimed, and illustrated in the accompanying drawings, in which—

Figure 1 is a vertical cross section through my improved dashpot and showing part of the scale with which it is associated.

Figure 2 is a horizontal cross section taken on line 2—2 of Figure 1.

Figure 3 is a vertical cross section showing a modified form.

In the operation of weighing scales, a damping mechanism or dashpot is used to retard the movement of the scale mechanism and steady the operation thereof so as to eliminate violent movements and shocks. Thus the scale mechanism is safeguarded and the knife edge fulcrums thereof are protected against injury. This dashpot device usually comprises a container filled with a suitable liquid, preferably oil, and a member operating in said liquid and operable by a movable part of the scale. In the piston type of dashpot, a by-pass connection is provided for permitting the fluid displaced by the movement of the piston to travel from one side thereof to the other. The cross sectional area of the opening connecting the piston chamber with the by-pass connection can be regulated so as to control the flow of liquid therethrough. This regulation is necessary to obtain proper operating results and to compensate for the changes in viscosity of the liquid due to temperature conditions.

The primary purpose of the present invention is to simplify the construction of the damping mechanism and facilitate the adjustment of the parts controlling the by-passing of the liquid.

Referring by numerals to the accompanying drawings, 10 indicates a lever of a scale mechanism, and connected to this lever at 11 is the upper end of a piston rod 12. The lower end of this piston rod carries a piston 14 which operates in a cylinder or inner member 15. This cylinder is formed open at both ends and the upper end 15$^a$ is secured to the inner face of a tubular extension 16 which is stationary, and, in the present case, is fixed to the frame or support 17 of the scale mechanism. The lower end 15$^b$ of cylinder 15 terminates adjacent to the bottom wall 18 of an outer cylinder or shell 19.

The latter is of greater cross sectional area than said cylinder 15 and completely encloses it, thereby forming an annular chamber or by-pass passage 20 through which the liquid contained in cylinder 15 can be passed to either side of piston 14.

To enable the passage of liquid between the chamber of cylinder 15 and chamber 20, said cylinder 15 is provided in its upper end with a series of spaced apertures 21 which are located a suitable distance above the end of the upward stroke of piston 14 and serve to discharge the liquid displaced by the upward movement of said piston to pass from the chamber of said cylinder 15 to the by-pass chamber 20. Thus on the upward stroke of the piston the liquid above the piston is by-passed through apertures 21 into the annular chamber 20 and the liquid contained in the latter is drawn into the lower end of cylinder 15 through the passage formed by the spacing of the lower end 15ᵇ from bottom 18. On the downward stroke of the piston, the flow of the liquid is reversed so that the liquid is discharged outwardly from the piston chamber through the lower end of member 15 and flows inwardly into said piston chamber through apertures 21.

The movement of the piston 14 in the chamber of cylinder 15 is resisted by the liquid contained in the latter and thus the operation of the mechanism with which said piston is associated is retarded or dampened, the degree of movement of said mechanism being controlled by the movement of liquid from one side of the piston to the other. In order to regulate this movement of liquid and either retard or speed up the movement of the piston and associated mechanism, the clearance between the lower end 15ᵇ and bottom 18 is reduced or increased by adjusting one of said members axially relatively to the other.

As shown in Figures 1 and 2, inner member 15 is stationary and the outer member 19 is adjustable. To provide for this adjustment, the upper end of this member 19 is provided with an internal screw thread, as indicated at 22, and the outer peripheral face of extension 16 is threaded to receive this threaded end of member 19. Thus by turning said member in the proper direction, the latter is adjusted axially to increase or decrease the distance between the bottom of said member and the lower end 15ᵇ of inner member 15, thereby correspondingly facilitating or retarding the movement of liquid between said members and similarly speeding up or dampening the movement of the piston.

In the modified form shown in Figure 3, the outer member 24 is held stationary, and the inner member 25 is adjustable in axial direction to regulate the clearance between the two members.

The upper end 15ᵃ of cylinder 15 is preferably provided with a suitable cover 26 having a central portion apertured for the passage of a piston rod and inclined centrally and downwardly so as to deflect the liquid contained in member 15 and prevent splashing thereof outwardly past the upper cover portion 27.

The dashpot of my improved construction contains but few parts, is simple in operation, and can be readily adjusted, to provide accurate operation of the device. The construction, therefore, does not require expensive operations and can be manufactured economically.

While I have shown and described the preferred forms of my invention, it is obvious that minor changes in the size, form and construction of my device can be made and substituted for those herein shown and described, without departing from the spirit of my invention.

I claim:

1. A damping mechanism for weighing scales comprising a support having a depending tubular extension exteriorly threaded at its lower end, an inner open-ended cylinder secured at its upper end within the lower end of said tubular extension, an outer cylinder having a closed lower end and interiorly threaded at its upper end and screw-seated on said threaded end of said tubular extension whereby said outer cylinder is adjustable axially relatively to said inner cylinder so as to regulate the clearance between the open lower end of said inner cylinder and the bottom of said outer cylinder, said inner cylinder being provided with a series of apertures spaced from the lower end thereof, whereby liquid contained in said cylinders can pass therebetween at points spaced longitudinally, and a piston associated with said scale mechanism and operating in said inner cylinder between the points of communication between said cylinders.

2. A damping mechanism for weighing scales comprising in combination a stationary support having a depending tubular extension provided on its end with an exterior screw thread, an inner cylinder fixed at its upper end within the end of said tubular extension, an outer cylinder having a closed lower end and having its upper end interiorly threaded and screwed on the threaded end of said tubular extension whereby said outer cylinder can be adjusted axially, said inner cylinder being spaced apart from said outer cylinder and having an open lower end spaced from the lower end of said outer cylinder whereby the size of the opening between the lower ends of said cylinders can be regulated by adjusting said outer cylinder, thereby controlling the volume of liquid passing therethrough, said inner cylinder being provided with a series of apertures spaced from the lower end thereof, whereby liquid contained in said cylinders can pass therebetween at points spaced longitudinally, and a piston associated with said scale mechanism and operating in said inner cylinder between the points of communication between said cylinders.

3. A damping mechanism for weighing scales comprising in combination a stationary support, a tubular extension extending downwardly from said support and having its lower end provided with an exteriorly disposed screw thread, an open-ended inner cylinder having its upper end secured within the end of said tubular extension, an outer cylinder enclosing said inner cylinder and having its upper end provided with an internally disposed screw thread for engaging the exterior screw thread of said tubular extension, the lower end of said outer cylinder being closed, said outer cylinder being adjustable axially to regulate the clearance between the upper end of said inner cylinder and the closed end of said outer cylinder, thereby controlling the passage of liquid therethrough, said inner cylinder being provided with a series of apertures spaced from the lower end thereof, whereby liquid container in said cylinders can pass therebetween at points spaced longitudinally, and a piston associated with said scale mechanism and operating in said inner cylinder between the points of communication between said cylinders.

4. A damping mechanism for weighing scales comprising in combination a stationary support, a tubular extension extending downwardly from said support and provided at its lower end with an external screw thread, an inner cylinder fixed within the lower end of said tubular extension and open at both ends, a piston operating in said inner cylinder and adapted to be associated with a scale mechanism, and an outer cylinder spaced from and enclosing said inner cylinder and provided with a closed bottom arranged in spaced relation with the open lower end of said inner cylinder, said outer cylinder being provided on its upper end with an internal screw thread engaging the external screw thread of said tubular extension whereby said outer cylinder is adjustable in axial direction to regulate the clearance between the open lower end of said inner cylinder and the closed lower end of said outer cylinder, thereby controlling the flow of liquid between said cylinders at this point, said inner cylinder being provided in its length with by-pass passages at points immediately above the extreme end of the upper stroke of said piston.

In testimony whereof I hereunto affix my signature this 1st day of July, 1929.

MERVIL HALLEAD.